Patented Dec. 14, 1926.

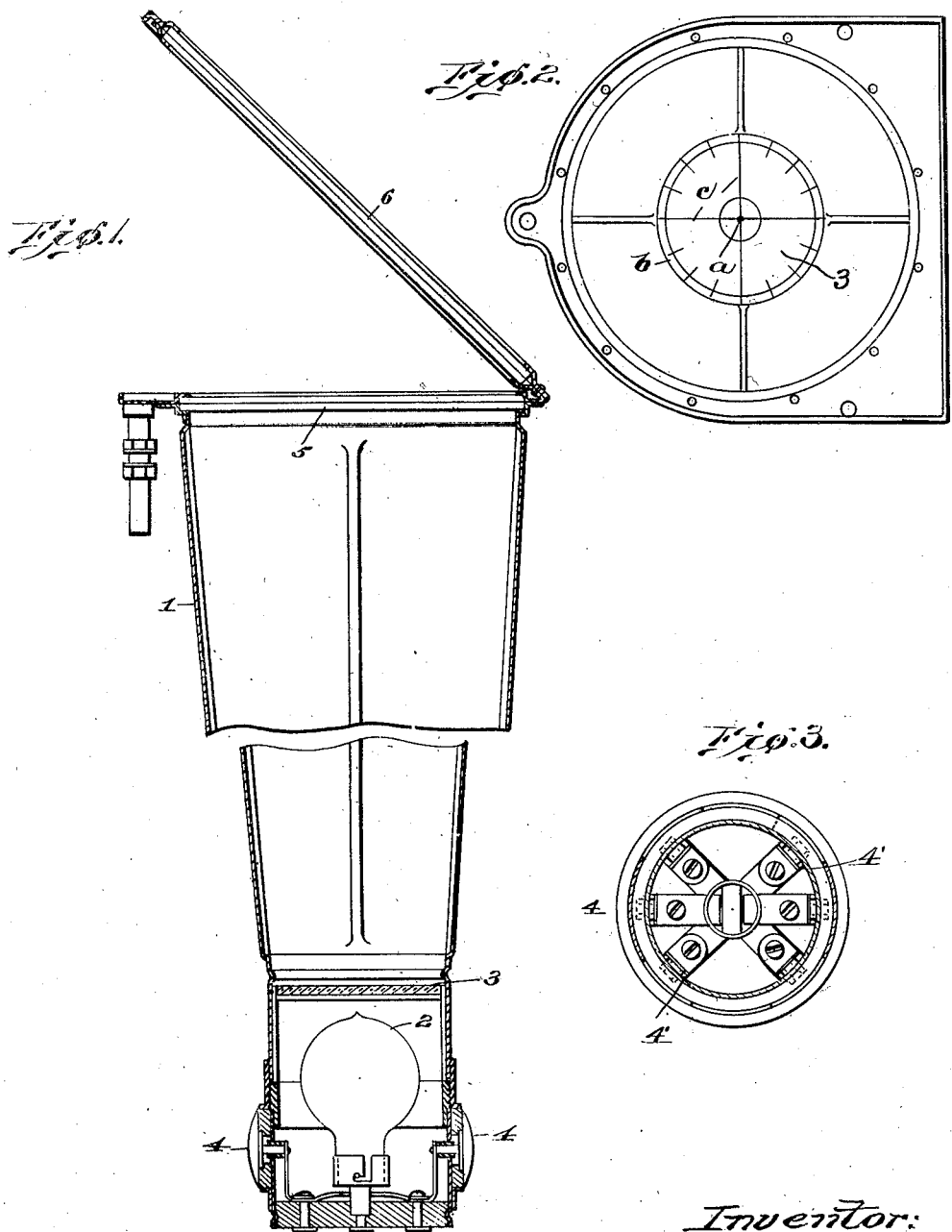

1,610,532

UNITED STATES PATENT OFFICE.

HERBERT OWEN RUSSELL, OF SANTA ANA, CALIFORNIA, AND CHARLES LEIGH PAULUS, OF DAYTON, OHIO.

MIRROR GUN SIGHT.

Application filed April 18, 1922. Serial No. 555,398.

This invention relates to gun sights especially adapted to be mounted upon the cowl of an airplane or aircraft and to form a part of the wind shield. The mechanism is particularly adapted to sighting fixed synchronized machine guns and is designed to take the place of the present fixed auxiliary ring and bead sights or unit optical sights.

With the above and other objects in view, the invention consists in the novel construction, combination and arrangement herein fully described, illustrated and claimed.

In the accompanying drawings:

Figure 1 is a side elevation of the improved gun sight.

Figure 2 is a top plan view thereof omitting the combined mirror and wind shield.

Figure 3 is a cross section through the lower portion of the device showing the method of light control.

In the embodiment of the invention illustrated in the drawings, the device comprises a housing 1 carrying in the lower end thereof an electric lamp 2. Above the lamp 2 there is arranged a target pattern 3 preferably of yellow glass and containing a pattern shown as consisting of a center bead $a$, ring $b$, concentric with the bead and cross hairs or lines $c$ perpendicular to each other.

In the bottom of the housing 1 is a light adjustment ring 4 carrying a plurality of contacts 4' as shown in Figure 3 so that by turning the ring, more or less resistance may be thrown into the lamp circuit for regulating the degree of illumination.

In the upper end of the housing 1 there is a lens 5 which is at its focal length from the target pattern 3 and a portion of a semi-mirror glass 6 set at an angle of forty-five degrees to the focal axis of the lens. The rays of light from the lamp 2 pass through the target pattern, emerge from the lens 5 in parallel rays and are partially reflected to the rear by the semi-mirror reflector 6. Such surface of the reflector acts both as a reflecting medium and the transmitter of light rays. In other words, objects may be seen by straight vision through the mirror at the same time that they are seen by reflection from another of its surfaces. The light adjusting ring 4 enables the resistance to be varied and consequently the intensity of the pattern reflected from the surface of the mirror 6 may be varied to agree with the intensity of the outside illumination such, for example, as the sun.

In using the sight, the target is viewed by true vision, directly through the mirror and the target pattern or ring and bead are viewed by reflected vision from the rear surface of the mirror 6. As the eye of the observer is raised or lowered or moved from side to side, the ring and bead being reflected from the rear surface are apparently moved proportional to the movement of the eye and consequently they will always be in proper relation with respect to the target. Thus in using such a sight, it is not necessary for the gunner to apply his eye at any fixed position.

What we claim is:

1. In a gun sight for use on aircraft having a semi-mirrored glass as a portion of the wind shield, a source of light, a housing therefor provided with a projecting lens mounted below said windshield portion and adapted to direct the light from said source thereon, and a target pattern between the source of light and said lens.

2. In a gun sight for use on aircraft having a semi-mirrored glass as a portion of the windshield thereof, a housing mounted below said windshield portion, a source of light and a projecting lens in said housing, and a target pattern between said source and said lens, said housing and said lens cooperating to project an image of said pattern on said wind shield.

3. In a gun sight for use on aircraft having a semi-mirrored glass as a portion of the wind shield thereof, a housing mounted below said windshield portion, a source of light and a projecting lens in said housing, and a target pattern between said source and said lens, said housing and said lens cooperating to project an image of said pattern on said windshield, and means for varying the intensity of the light from said source.

In testimony whereof we have affixed our signatures.

CHARLES LEIGH PAULUS.
HERBERT OWEN RUSSELL.